(12) United States Patent
Steele et al.

(10) Patent No.: US 10,346,837 B2
(45) Date of Patent: Jul. 9, 2019

(54) ADAPTIVE AUTHENTICATION OPTIONS

(75) Inventors: Kim Steele, Aldie, VA (US); Mike Yakel, Charlotte, NC (US); Kevin Weller, San Anselmo, CA (US); Patrick Faith, Pleasanton, CA (US); Lori D. Van Deloo, Los Altos, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 822 days.

(21) Appl. No.: 11/935,740

(22) Filed: Nov. 6, 2007

(65) Prior Publication Data

US 2008/0120214 A1 May 22, 2008

Related U.S. Application Data

(60) Provisional application No. 60/866,191, filed on Nov. 16, 2006.

(51) Int. Cl.
*G07F 7/10* (2006.01)
*G06Q 20/34* (2012.01)
(Continued)

(52) U.S. Cl.
CPC ........... *G06Q 20/40* (2013.01); *G06Q 20/341* (2013.01); *G06Q 20/4014* (2013.01);
(Continued)

(58) Field of Classification Search
USPC ...................................... 705/35–45; 713/183
See application file for complete search history.

(56) References Cited

U.S. PATENT DOCUMENTS 5,465,206 A   11/1995   Hilt et al.
5,477,038 A   12/1995   Levine et al.
(Continued)

FOREIGN PATENT DOCUMENTS

KR   20060073327 A   6/2006

OTHER PUBLICATIONS

Ken Clark. (Aug. 2004). Trust, but Verify. Chain Store Age, 80(8), 174. Retrieved May 18, 2009, from ABI/INFORM Global database. (Document ID: 679162741).*

(Continued)

*Primary Examiner* — Leland Marcus
(74) *Attorney, Agent, or Firm* — Kilpatrick Townsend & Stockton LLP

(57) ABSTRACT

A method for authenticating a consumer for a portable consumer device is disclosed. One embodiment of the invention includes receiving a transaction message relating to a request by a consumer to conduct a transaction using a portable consumer device, wherein the consumer was previously enrolled in an authentication program and the consumer was previously authenticated, analyzing the transaction message to determine if a re-authentication event has taken place, causing a re-authentication message to be sent to the consumer before initiating an authorization request message to the issuer if the re-authentication event has taken place, and initiating the authorization request message to the issuer without sending the re-authentication message to the consumer if the re-authentication event has not taken place.

14 Claims, 8 Drawing Sheets

(51) Int. Cl.
  *G06Q 20/40* (2012.01)
  *G06Q 30/06* (2012.01)
  *G06Q 40/00* (2012.01)

(52) U.S. Cl.
  CPC ............ *G06Q 30/06* (2013.01); *G06Q 40/00* (2013.01); *G07F 7/1008* (2013.01)

(56) References Cited

U.S. PATENT DOCUMENTS

| | | | |
|---|---|---|---|
| 5,500,513 | A | 3/1996 | Langhans et al. |
| 5,621,201 | A | 4/1997 | Langhans et al. |
| 5,815,665 | A | 9/1998 | Teper et al. |
| 5,845,070 | A | 12/1998 | Ikudome |
| 6,247,129 | B1 | 6/2001 | Keathley et al. |
| 6,270,011 | B1 | 8/2001 | Gottfried |
| 6,272,472 | B1 * | 8/2001 | Danneels et al. ............... 705/27 |
| 6,282,522 | B1 | 8/2001 | Davis et al. |
| 6,560,581 | B1 | 5/2003 | Fox et al. |
| 6,837,425 | B2 | 1/2005 | Gauthier et al. |
| 6,915,279 | B2 | 7/2005 | Hogan et al. |
| 6,920,611 | B1 | 7/2005 | Spaeth et al. |
| 6,957,334 | B1 | 10/2005 | Goldstein et al. |
| 7,007,840 | B2 | 3/2006 | Davis |
| 7,039,611 | B2 | 5/2006 | Devine |
| 7,051,923 | B2 | 5/2006 | Nguyen et al. |
| 7,058,817 | B1 * | 6/2006 | Ellmore ........................ 713/183 |
| 7,104,446 | B2 | 9/2006 | Bortolin et al. |
| 7,111,789 | B2 | 9/2006 | Rajasekaran et al. |
| 7,121,456 | B2 | 10/2006 | Spaeth et al. |
| 7,124,937 | B2 | 10/2006 | Myers et al. |
| 7,136,841 | B2 | 11/2006 | Cook |
| 7,152,780 | B2 | 12/2006 | Gauthier et al. |
| 7,243,853 | B1 | 10/2007 | Levy et al. |
| 7,280,981 | B2 | 10/2007 | Huang et al. |
| 7,627,521 | B1 * | 12/2009 | Sheehan et al. ................ 705/38 |
| 2002/0099649 | A1 * | 7/2002 | Lee et al. ........................ 705/38 |
| 2002/0111919 | A1 | 8/2002 | Weller et al. |
| 2002/0157029 | A1 * | 10/2002 | French et al. ................ 713/202 |
| 2002/0194138 | A1 | 12/2002 | Dominguez et al. |
| 2003/0120593 | A1 | 6/2003 | Bansal et al. |
| 2003/0172040 | A1 | 9/2003 | Kemper et al. |
| 2003/0200184 | A1 * | 10/2003 | Dominguez et al. ........... 705/78 |
| 2003/0212642 | A1 | 11/2003 | Weller et al. |
| 2003/0233292 | A1 | 12/2003 | Richey et al. |
| 2004/0019522 | A1 | 1/2004 | Bortolin et al. |
| 2004/0044621 | A1 | 3/2004 | Huang et al. |
| 2004/0050922 | A1 | 3/2004 | Gauthier et al. |
| 2004/0054581 | A1 | 3/2004 | Redford et al. |
| 2004/0054590 | A1 | 3/2004 | Redford et al. |
| 2004/0054591 | A1 | 3/2004 | Spaeth et al. |
| 2004/0059688 | A1 | 3/2004 | Dominguez et al. |
| 2004/0083394 | A1 | 4/2004 | Brebner et al. |
| 2004/0139021 | A1 | 7/2004 | Reed et al. |
| 2004/0148224 | A1 | 7/2004 | Gauthier et al. |
| 2004/0153715 | A1 | 8/2004 | Spaeth et al. |
| 2004/0220964 | A1 | 11/2004 | Shiftan et al. |
| 2005/0021456 | A1 | 1/2005 | Steele et al. |
| 2005/0029344 | A1 | 2/2005 | Davis |
| 2005/0036611 | A1 | 2/2005 | Seaton, Jr. et al. |
| 2005/0045718 | A1 | 3/2005 | Bortolin et al. |
| 2005/0058427 | A1 | 3/2005 | Nguyen et al. |
| 2005/0071225 | A1 | 3/2005 | Bortolin et al. |
| 2005/0071226 | A1 | 3/2005 | Nguyen et al. |
| 2005/0071227 | A1 | 3/2005 | Hammad et al. |
| 2005/0071228 | A1 | 3/2005 | Bortolin et al. |
| 2005/0071235 | A1 | 3/2005 | Nguyen et al. |
| 2005/0097320 | A1 | 5/2005 | Golan et al. |
| 2005/0102234 | A1 | 5/2005 | Devine |
| 2005/0121506 | A1 | 6/2005 | Gauthier et al. |
| 2005/0149455 | A1 | 7/2005 | Bruesewitz et al. |
| 2005/0240522 | A1 | 10/2005 | Kranzley et al. |
| 2005/0246278 | A1 | 11/2005 | Gerber et al. |
| 2005/0283416 | A1 | 12/2005 | Reid et al. |
| 2005/0283430 | A1 | 12/2005 | Reid et al. |
| 2005/0283431 | A1 | 12/2005 | Reid et al. |
| 2005/0283432 | A1 | 12/2005 | Reid et al. |
| 2005/0283433 | A1 | 12/2005 | Reid et al. |
| 2006/0006224 | A1 | 1/2006 | Modi |
| 2006/0006226 | A1 * | 1/2006 | Fitzgerald et al. ........... 235/380 |
| 2006/0080243 | A1 | 4/2006 | Kemper et al. |
| 2006/0155644 | A1 | 7/2006 | Reid et al. |
| 2006/0163345 | A1 | 7/2006 | Myers et al. |
| 2006/0178957 | A1 | 8/2006 | LeClaire |
| 2006/0179007 | A1 | 8/2006 | Davis |
| 2006/0290501 | A1 | 12/2006 | Hammad et al. |
| 2006/0293027 | A1 | 12/2006 | Hammad et al. |
| 2007/0001000 | A1 | 1/2007 | Nguyen et al. |
| 2007/0001001 | A1 | 1/2007 | Myers et al. |
| 2007/0005613 | A1 | 1/2007 | Singh et al. |
| 2007/0005774 | A1 | 1/2007 | Singh et al. |
| 2007/0012764 | A1 | 1/2007 | Bortolin et al. |
| 2007/0017970 | A1 | 1/2007 | Gauthier et al. |
| 2007/0034679 | A1 | 2/2007 | Gauthier et al. |
| 2007/0053518 | A1 * | 3/2007 | Tompkins et al. ............ 380/270 |
| 2007/0055597 | A1 | 3/2007 | Patel et al. |
| 2007/0055630 | A1 | 3/2007 | Gauthier et al. |
| 2007/0057034 | A1 | 3/2007 | Gauthier et al. |
| 2007/0057051 | A1 | 3/2007 | Bortolin et al. |
| 2007/0083465 | A1 | 8/2007 | Ciurea et al. |
| 2007/0100691 | A1 | 9/2007 | Patterson |
| 2007/0125842 | A1 | 10/2007 | Antoo et al. |

OTHER PUBLICATIONS

Jill Papworth. (Nov. 26, 2005). Money: Guard your Christmas cards: Buying online: Shoppers are expected to spend a record pounds 5bn this year. Jill Papworth advises how to do it safely. The Guardian,p. 7. Retrieved May 18, 2009, from ProQuest Newsstand database. (Document ID: 931898741).*
International Preliminary Report on Patentability from International Application No. PCT/US2007/084565 dated May 19, 2009.
Notice of First Office Action for Chinese Patent Application No. 200780049031.4, dated Apr. 26, 2011, 16 pages.
Notice of Second Office Action for Chinese Patent Application No. 200780049031.4, dated Mar. 30, 2012, 9 pages.
Decision on Rejection for Chinese Patent Application No. 200780049031.4, dated Sep. 4, 2013, 22 pages.
Examiner's First Report for Australian Patent Application No. 2007323917, dated Aug. 1, 2011, 3 pages.
Further Examiner's Report for Australian Patent Application No. 2007323917, dated May 28, 2012, 2 pages.
Office Action in European Patent Application No. 07868746.4, dated Sep. 6, 2011, 6 pages.
Non-Final Office Action for Canadian Patent Application Serial No. 2,670,264, dated Aug. 29, 2014, 5 pages.
Fourth Office Action with English Translation issued in Chinese Application No. 200780049031.4 dated Apr. 1, 2013, 22 pages.
Notice on the Third Office Action and the Report of the Third Office Action issued in International Application No. 200780049031.4 dated Aug. 31, 2012, 22 pages.

* cited by examiner

Please enter your credit card information below:

first name: 
last name: 
address: 
city: 
state:  zip:

type of card: Visa  VISA
card number:

submit order

FIG. 3

ововATIVE AUTHENTICATION OPTIONS

ADAPTIVE AUTHENTICATION OPTIONS

CROSS-REFERENCES TO RELATED APPLICATIONS

This patent application is a non-provisional of and claims priority to U.S. provisional patent application No. 60/866,191, filed on Nov. 16, 2006, which is herein incorporated by reference in its entirety for all purposes.

BACKGROUND

In a typical purchase transaction, a consumer may use a portable consumer device to pay for goods or services from a merchant. It is important to ensure that the consumer is the authorized user of the portable consumer device that is used to make the purchase. Otherwise, the issuers of such portable consumer devices, merchants, consumers, etc. are at risk of losing money. Further, if consumers perceive that buying goods and services using such portable consumer devices is not safe and secure, they may be inhibited from using them. Ensuring that a consumer is an authorized user of a portable consumer device becomes especially important in situations where the consumer is not making the purchase in person, but rather is making the purchase online, through the mail, or over the phone.

To address the issue of unauthorized use or fraudulent purchases, many solutions have been developed. One example is the Verified by Visa™ service that enables an issuer to verify ownership of a portable consumer device during an online purchase. Once activated, a consumer can shop online at any participating online merchant using that portable consumer device and a password. Each time the consumer shops online at the participating merchant, he will see a Verified by Visa™ window. This window is used to allow the consumer to enter information that is authenticated by the issuer of the personal consumer device. After verifying the consumer's identity, the issuer creates and sends an authentication response to the merchant, who can thereafter decide to proceed or not proceed with the transaction.

These types of solutions help give consumers more confidence to make purchases over the Internet and also allow issuers, acquirers, and merchants to enjoy increased online transaction volumes and reduced exposure to fraud.

However, there are many business models that have emerged that are not conducive to prompting the consumer for a password each time the consumer makes a purchase online. For example, a consumer may have set up a recurring payment for a particular good or service so that the bills for these goods or services can be paid automatically each month, a consumer may regularly make small purchases (e.g., a micro-payment) such as buying songs online, or a merchant may have set up a one-step online payment so a regular consumer can simply click one button to make a purchase, instead of re-entering his billing information every time. These business models were designed specifically to save time and effort for the consumer, allowing the consumer to make a purchase in as few steps as possible. Merchants using these business models have been reluctant to adopt an authentication solution where they will be obligated to prompt the consumer for a password or other form of identification every time a purchase is made. Thus, a different solution is needed to authenticate consumers under these business models to ensure authentication and lower the risk of unauthorized use and fraud, but still allow for an easy and quick process for a consumer making a payment transaction.

Embodiments of the invention address these and other problems individually and collectively.

SUMMARY

Embodiments of the invention are directed to methods, systems, and computer readable media for allowing financial transactions to be conducted in a secure manner.

One embodiment of the invention is directed to a method comprising receiving a transaction message (e.g., a purchase message) relating to a request by a consumer to conduct a transaction (such as a purchase transaction) using a portable consumer device, wherein the consumer was previously enrolled in an authentication program and the consumer was previously authenticated, analyzing the transaction message to determine if a re-authentication event has taken place, causing a re-authentication message to be sent to the consumer before initiating an authorization request message to the issuer if the re-authentication event has taken place, and initiating the authorization request message to the issuer without sending the re-authentication message to the consumer if the re-authentication event has not taken place.

Another embodiment of the invention is directed to a method comprising receiving a transaction message relating to a request by a consumer to conduct a transaction using a portable consumer device, analyzing the transaction message to determine if a re-authentication event has taken place, causing an authentication message to be sent to the consumer before initiating an authorization request message if the re-authentication event has taken place, and initiating the authorization request message without sending the authentication message to the consumer if the re-authentication event has not taken place, wherein the transaction uses a recurring payment, a micro-payment, or a one-step online payment.

Another embodiment of the invention is directed to a method comprising sending a transaction message to a website by a consumer using a portable consumer device, wherein the consumer was previously enrolled in an authentication program, receiving a re-authentication request for re-authentication information only if a re-authentication event has taken place, and sending re-authentication information in response to the re-authentication request.

Other embodiments of the invention are directed to computer readable media comprising code for performing the above-described methods as well as systems, apparatuses and devices that perform the methods and/or that use the computer readable media.

These and other embodiments of the invention are described in further detail below.

BRIEF DESCRIPTION OF THE DRAWINGS

FIG. 3 shows an exemplary information request that prompts a consumer for credit card information.

DETAILED DESCRIPTION

Embodiments of the invention allow entities such as merchants, issuers, payment processing organizations, and/or third parties to re-authenticate a consumer after a consumer has attempted to conduct a transaction and after the consumer has enrolled in an authentication program. The transaction may be a type of transaction that would not normally require the consumer to be authenticated by providing a password or the like, because the type of transaction should either occur very quickly (as intended by a merchant), or because the transaction may occur without the user's active involvement (e.g., as in a recurring bill payment process).

Embodiments of the invention can allow a merchant, an issuer, a payment processing organization, a third party, or any combination of such entities to receive a purchase message relating to a request by a consumer to conduct a purchase transaction using a portable consumer device. The consumer may have been previously enrolled in an authentication program. The authentication program may be one in which the consumer is asked to re-authenticate himself (e.g., with a password) before conducting online transactions during normal transactions.

If a specialized transaction is conducted, then the consumer would be re-authenticated only if a re-authentication event has occurred. Specialized transactions include transactions that involve small payment amounts, recurring payments, and payments made in one-step transactions. Re-authentication in such situations may be inconvenient to consumers and/or may slow down the purchasing process.

After the purchase message is received, the purchase message is analyzed to determine if a re-authentication event has taken place. An example of a re-authentication event can be a change in home address. A re-authentication message is then sent to the consumer before initiating an authorization request message to the issuer if the re-authentication event has taken place.

If the re-authentication event has not taken place, then the process for sending the authorization request message to the issuer can be initiated.

Additional details regarding embodiments of the invention are described below.

Figure 1A:
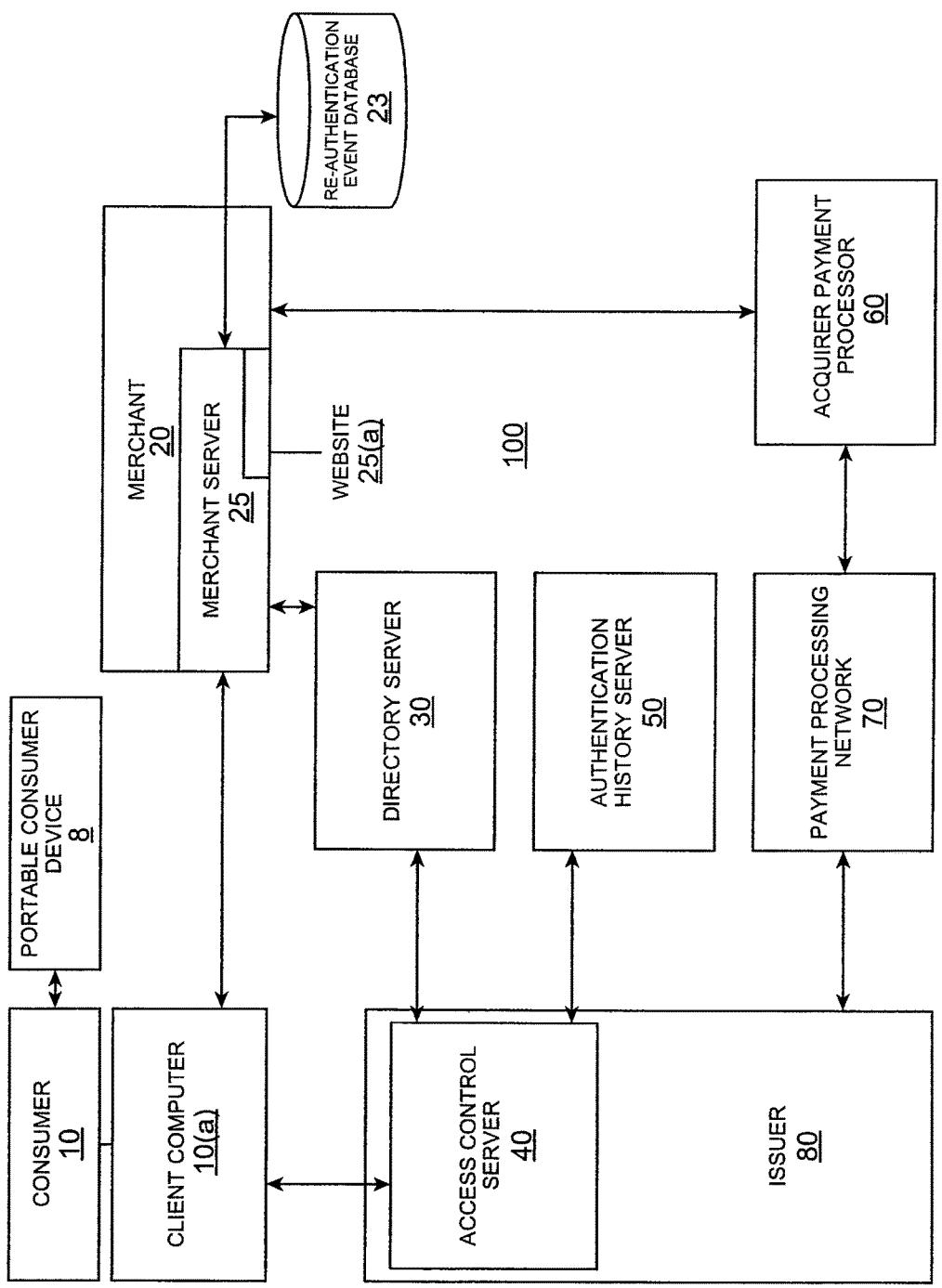
FIG. 1(a) shows a block diagram of a system according to an embodiment of the invention.

FIG. 1(a) shows a system that can be used for conducting a payment transaction. For simplicity of illustration, one merchant, one issuer, one acquirer, one portable consumer device, and one consumer are shown. It is understood, however, that embodiments of the invention may include multiple merchants, acquirers, portable consumer devices, and/or consumers. In addition, some embodiments of the invention may include fewer than all of the components shown in FIG. 1(a). Also, the components in FIG. 1(a) may communicate via any suitable communication medium (including the Internet), using any suitable communication protocol.

The system 100 includes a merchant 20 and an acquirer payment processor 60 associated with the merchant 20. In a typical payment transaction, a consumer 10 may purchase goods or services at the merchant 20 using a portable consumer device 8. The acquirer payment processor 60 may be in operative communication with an issuer 80 of the portable consumer device 8 via a payment processing network 70. The merchant 20 can be in operative communication with an access control server 40 that is associated with (e.g., at or operated by) an issuer 80 via a directory server 30. An authentication history server 50 may also be in operative communication with the access control server 40 at the issuer 80.

The acquirer payment processor 60 is typically a bank that has a merchant account. The issuer 80 may also be a bank, but could also be a business entity such as a retail store. Some entities are both acquirers and issuers, and embodiments of the invention include such entities.

Figure 1B:
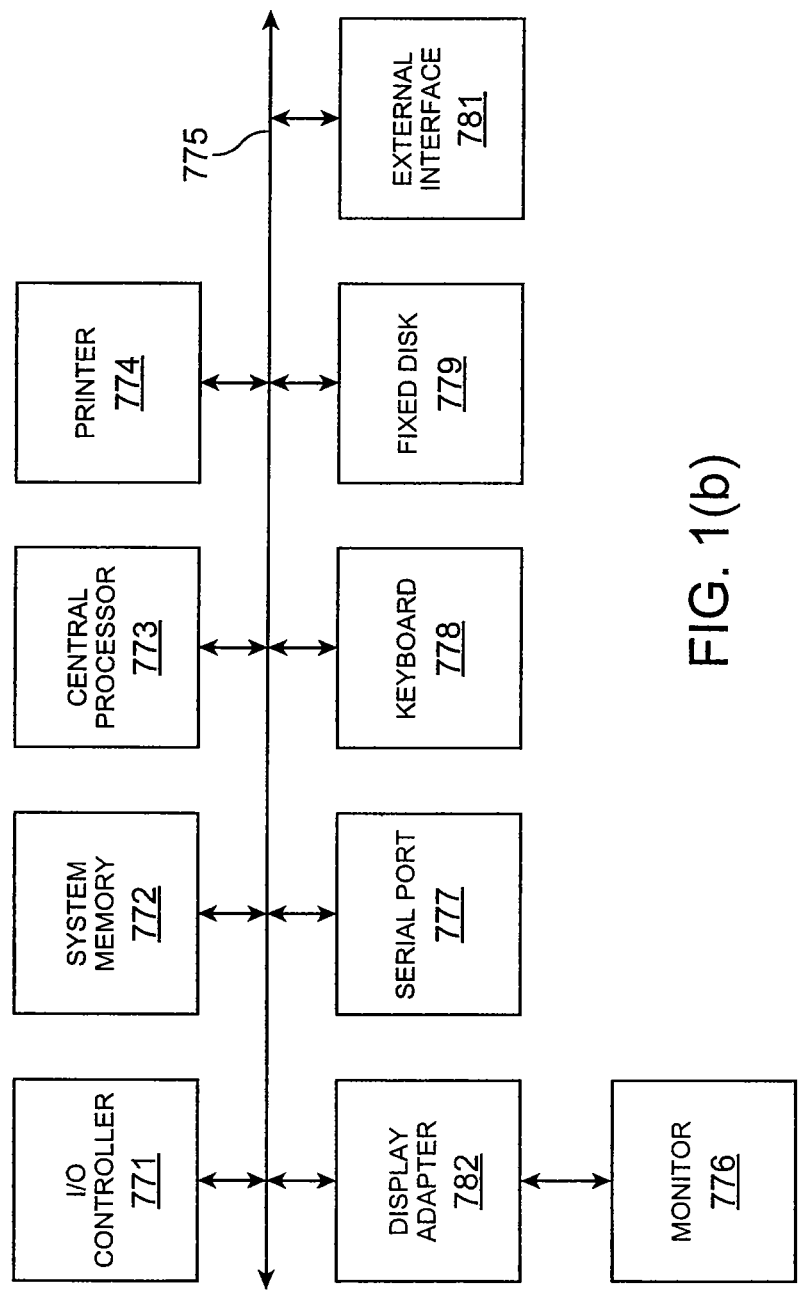
FIG. 1(b) shows a block diagram of a computational apparatus that can be used in embodiments of the invention.

The consumer 10 may be an individual, or an organization such as a business that is capable of purchasing goods or services. The consumer 10 may operate a client computer 10(a). The client computer 10(a) can be a desktop computer, a laptop computer, a wireless phone, a personal digital assistant (PDA), etc. It may operate using any suitable operating system including a Windows™ based operating system. Basic components of the client computer 10(a) are shown in FIG. 1(b).

The client computer 10(a) may utilize any suitable number of subsystems. Examples of such subsystems or components are shown in FIG. 1(b). The subsystems shown in FIG. 1(b) are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

The portable consumer device 8 may be in any suitable form. For example, suitable portable consumer devices can be hand-held and compact so that they fit into a consumer's wallet and/or pocket (e.g., pocket-sized). They may include smart cards, ordinary credit or debit cards (with a magnetic strip and without a microprocessor), keychain devices (such as the Speedpass™ commercially available form Exxon-Mobil Corp.), etc. Other examples of portable consumer devices include cellular phones, PDAs, pagers, payment cards, security cards, access cards, smart media, transponders, and the like. The portable consumer devices can also be debit services (e.g., a debit card), credit devices (e.g., a credit card), or stored value devices (e.g., a stored value card).

The payment processing network 70 is located between (in an operational sense) the acquirer payment processor 60 and the issuer 80. It may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 70 may use any suitable wired or wireless network, including the Internet.

The merchant 20 may be associated with (e.g., may have or may operate) a merchant server computer 25 operating a website 25(*a*). A "server computer" as used herein, is typically a powerful computer or cluster of components. For example, the server computer 25, or any other server computer shown in FIG. 1 or elsewhere can be a large mainframe, a minicomputer cluster, or a group of servers functioning as a unit. In one example, the server computer may be a database server coupled to a Web server.

The merchant 20 may have one or more additional access devices (not shown). Suitable access devices include interfaces and may include point of sale (POS) devices, cellular phones, PDAs, personal computers (PCs), tablet PCs, handheld specialized readers, set-top boxes, electronic cash registers (ECR), automated teller machines (ATM), virtual cash registers (VCR), kiosks, security systems, access systems, and the like. They can interact with portable consumer devices. For example, a consumer 10 using a credit card to purchase a good or service can swipe it through an appropriate slot in the POS terminal. Alternatively the POS terminal may be a contactless reader, and the portable consumer device 8 may be a contactless device such as a contactless card. As another alternative, a consumer 10 may purchase a good or service via a merchant's website where the consumer enters the credit card information into the client computer 10(*a*) and clicks on a button to complete the purchase. The client computer 10(*a*) may be considered an access device.

The website 25(*a*) may allow the consumer 10 to purchase goods or services offered by the merchant 20. The website 25(*a*) may include any suitable features. For example, it may be configured to provide for one-step online payment processing. An example of a one-step online payment process is the "one click" shopping process offered by Amazon.com. In another example, the website 25(*a*) may allow the consumer 10 to make recurring payments such as monthly payments for monthly invoices (e.g., utility invoices). In yet another example, the website 25(*a*) may allow for the purchase of items (e.g., songs) which may have low value (e.g., less than $5). An example of a suitable website 25(*a*) may be a website that allows for the purchase of music. This may be referred to as a micro-payment in some instances.

The merchant server 25 may also comprise a program such as a plug in. The plug in may be software which allows the server computer 25 to perform such functions as determining if the consumer's portable consumer device 8 is enrolled in an authentication program (e.g., by querying a directory server). The software may also allow the server computer 25 to determine if the current transaction is a specialized transaction (e.g., a one-step online payment transaction, a recurring payment transaction, or a transaction involving a micro-payment) or if it is a normal transaction. If the consumer 10 is not enrolled in the authentication program, then the transaction would proceed as it normally would in a conventional purchase transaction. If the consumer 10 is enrolled, but the transaction is not a specialized transaction, then the consumer 10 may be asked to re-authenticate himself via the consumer's client computer 10(*a*) whether or not a re-authentication event has occurred. If the consumer 10 is enrolled, but the transaction is a specialized transaction, then the consumer 10 may be asked to re-authenticate himself only if a re-authentication event has occurred. If the transaction is a specialized one and a re-authentication event has not occurred, then the consumer 10 would not be asked to re-authenticate himself. The merchant server 25 may comprise a computer readable medium comprising computer code for performing any suitable permutation of these functions.

The merchant 20 may also be associated with a re-authentication event database 23, if the merchant 20 checks to see if re-authentication of the consumer 10 is needed. In the alternative embodiment, the re-authentication event database can reside at or otherwise be associated with the issuer 80, if the issuer 80 or some other entity (e.g., a third party) checks to see if re-authentication of the consumer 10 is needed.

Figure 2:
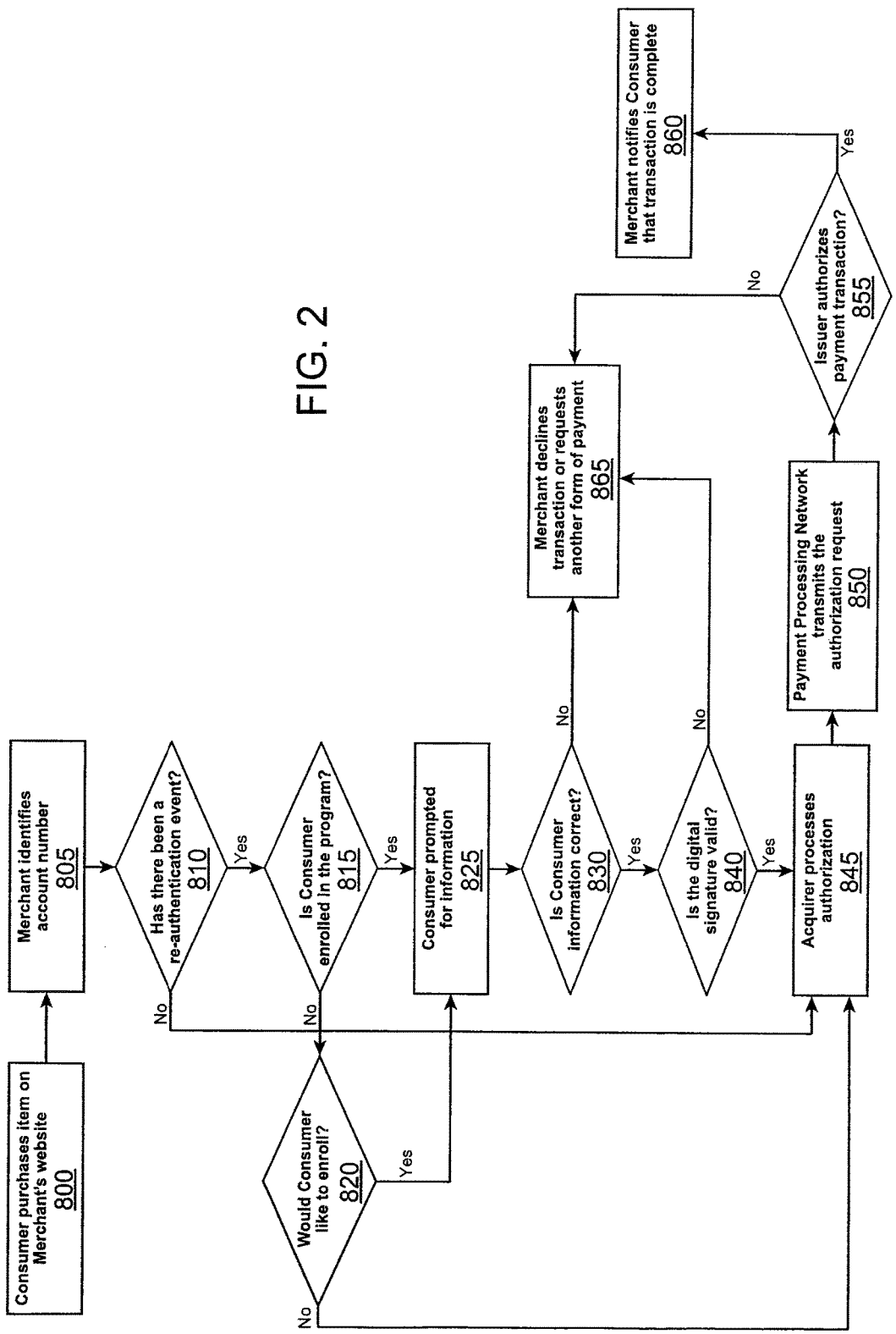
FIG. 2 shows a flowchart illustrating steps in a method according to an embodiment of the invention.

FIG. 2 shows a flowchart including a general method according to an embodiment of the invention. The method can be described with reference to the block diagram in FIG. 1(*a*).

First, the consumer 10 enrolls in an authentication program. The authentication program may be run by any suitable entity including a payment processing organization, an issuer, a third party processor, etc.

The consumer 10 may want to enroll in the authentication program so that greater security is provided for the consumer 10 when the consumer 10 buys goods or services via the Internet. By enrolling in the authentication program, the consumer 10 will be prompted to re-authenticate himself before purchases can be made via the Internet. An exception to this would be if a specialized transaction (e.g., a one-step purchase process) is being conducted.

The consumer 10 may enroll in the authentication program before conducting a purchase transaction or during the purchase transaction using the client computer 10(*a*). During the enrollment process, the consumer 10 may be asked to verify the consumer's identity, create a password, and enter an account number or other identifier associated with the portable consumer device 8. This information may then be stored in the directory server 30, or some other location.

Figure 4:
FIG. 4 shows an exemplary information request that prompts a consumer for credit card and personal information.
Figure 5:
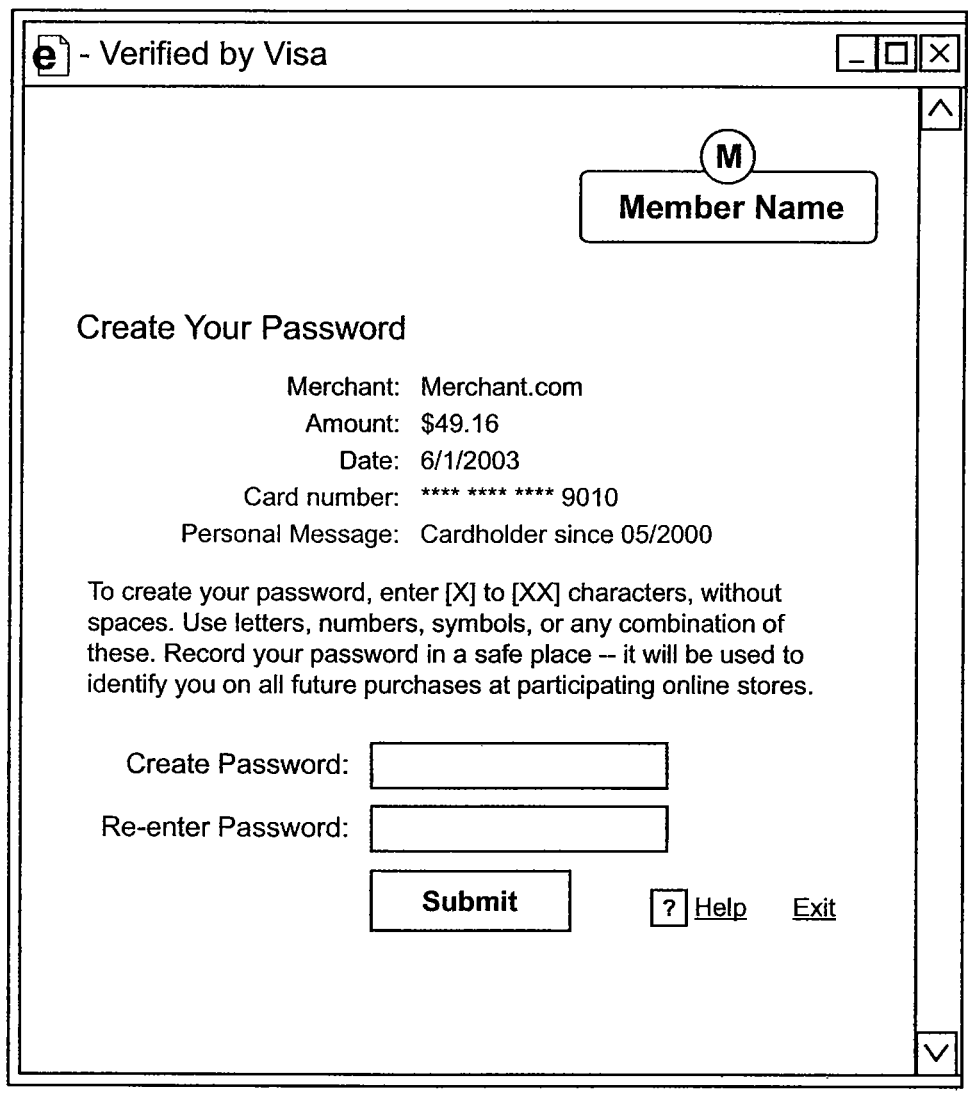
FIG. 5 shows an exemplary information request that prompts a consumer to create a password.

Screenshots that the consumer 10 might see on the client computer 10(*a*) during enrollment are shown in FIG. 3-5.

FIG. 3 shows a screenshot including data fields for the consumer to enter his or her name, address, type of portable consumer device, and account number.

FIG. 4 shows a screenshot including data fields for the consumer to enter the signature panel code associated with the consumer's portable consumer device, the last four digits of the consumer's social security number, the consumer's date of birth, and consumer's e-mail address. "Activate" and "Do Not Activate Now" buttons are shown. If the latter is selected, the entered data may be temporarily stored for later retrieval.

FIG. 5 shows a screenshot where the consumer can create a password. The consumer may be prompted to enter this password before proceeding with future transactions that are normal. As explained below, the consumer would not be prompted for the password if the transaction is a specialized one and no re-authentication event has occurred. If a re-authentication event has occurred, then the consumer would be prompted to re-authenticate himself by entering a password.

After the consumer is enrolled in the authentication program, the consumer 10 purchases a good or service from the merchant 20 using a portable consumer device 8 such as a credit card and a client computer 10(*a*) (step 800). The consumer 10 can interact with the merchant 20 and merchant server 25 through a website 25(*a*). For example, the website 25(*a*) can sell downloadable songs. The consumer 10 can select songs to purchase and may be prompted be asked if the consumer 10 wants to purchase selected songs for a fee (e.g., $1.00 per song).

Regardless of what type of purchase is being conducted, a purchase message is sent from client computer 10(*a*) operated by the consumer 10, to the merchant website 25(*a*) and consequently the merchant 20. The purchase message may include any suitable information that might be sent to a merchant during a typical Internet purchase transaction. For example, the purchase message may include information relating to the amount of the purchase, the item being purchased, and identifying information such as the consumer's account number (e.g., credit card number), an IP address of the client computer 10(*a*) being used by the consumer 10, etc.

Upon receiving the purchase message from a consumer 10, the merchant 20 identifies the identifying information for the portable consumer device 8 in the purchase message, such as a credit card account number (step 805). Other types of information identifying the portable consumer device 8 could be used in other embodiments of the invention. For example, the identifying information could additionally or alternatively include the consumer's name, the expiration date of the portable consumer device 8, a verification value such as a card verification value, etc.

After the merchant server computer 25 receives and identifies the identifying information for the portable consumer device 8, it analyzes the identifying information. As described below, the merchant server computer 25 may then cause, either directly or indirectly, a re-authentication message to be sent to the consumer 10 if the purchase transaction is a specialized one, and if a re-authentication event has occurred. It may then initiate (either directly or indirectly) the sending of an authorization request message to the issuer 80.

In one embodiment, if the merchant's website 25(*a*) conducts both specialized transactions (e.g., a one-step online payment transaction, a recurring payment transaction, or a transaction involving a micro-payment) or normal transactions, the merchant 20 may then determine if the current transaction is a specialized transaction (e.g., a one-step online payment transaction, a recurring payment transaction, or a transaction involving a micro-payment) or if it is a normal transaction. If it is a normal transaction, then the consumer 10 would be asked to re-authenticate himself as he would in a conventional re-authentication program. If it is a specialized transaction, then the purchase transaction may continue to proceed as shown in FIG. 2. Note that if the website 25(*a*) only conducts specialized transactions (e.g., a website that sells music and only conducts micro-payments), then the method does not need to determine of the transaction is a normal one or a specialized one.

If the transaction is a specialized transaction and the consumer 10 is enrolled in the authentication program, then the merchant server 25 determines if a re-authentication event has occurred by analyzing the purchase message against the re-authentication events in a re-authentication event database 23 (step 810). "Re-authentication events" may include an event that can indicate the potential for fraudulent activity such as a new consumer completing her first purchase, significant account changes, and orders that are perceived to be a higher-risk. For example, a re-authentication event can include a change in the consumer's home address, shipping address, billing address, email address, name, account number, payment method, portable consumer device expiration date, or password. Other examples of re-authentication events include: different or new IP addresses, out of pattern activities (e.g., jewelry purchases where the consumer does not normally buy jewelry), order amounts above a specified dollar amount (e.g., greater than $1000.00), a long period of inactivity in the account (e.g., at least one month, or twelve months), orders for particular types of goods (e.g., furniture, clothing, jewelry, or consumer electronics such as laptop computers, big screen TVs, etc.), authentication failures or attempts (e.g., a consumer fails to provide a password or other identifier in a prior transaction), changes in payment terms, instances where authentication attempts have failed more than a pre-determined number of times in the past, or where authentication occurred more than a pre-set amount of time in the past. A list of such events may be stored in the re-authentication database 23.

If a re-authentication event has occurred, the merchant 20, using the merchant server 25, sends the identifying information and optionally other information to the directory server 30. The directory server 30 may determine which issuer issued the portable consumer device 8. After the directory server 30 determines the issuer, the directory server 30 determines if the identified issuer participates in the authentication program. If the issuer does participate, the directory server 30 determines whether or not the consumer 10 and the portable consumer device 8 are enrolled in the authentication program (step 815). For example, if the issuer 80 of the portable consumer device 8 participates in the authentication program, then the directory server 30 sends a request to the access control server 40 of the issuer 80 to determine whether or not the portable consumer device 8 is enrolled in the authentication program.

The consumer 10 may be asked if he wants to enroll in the authentication program during the transaction (step 820). If the portable consumer device 8 and/or the consumer 10 are not enrolled, the merchant server 25 receives a message from the access control server 40 via the directory server 30 that the portable consumer device 8 and/or the consumer 10 are not enrolled or that authentication is not available. The merchant server 25 then proceeds with a standard transaction processing (steps 845, 850, 855, described below). If the portable consumer device 8 is enrolled in the authentication program, the access control server 40 returns a response to the directory server 30 indicating this.

The directory server 30 then forwards the response to the merchant server 25. After the merchant server 25 receives the response, the merchant server 25 sends an authentication request message to the to the client computer 10(*a*) for routing to the access control server 40. Alternatively, the authentication request message may be sent directly to the access control server 40 or the authentication request message may be sent to the directory server 30 for routing to the access control server 40.

Figure 6:
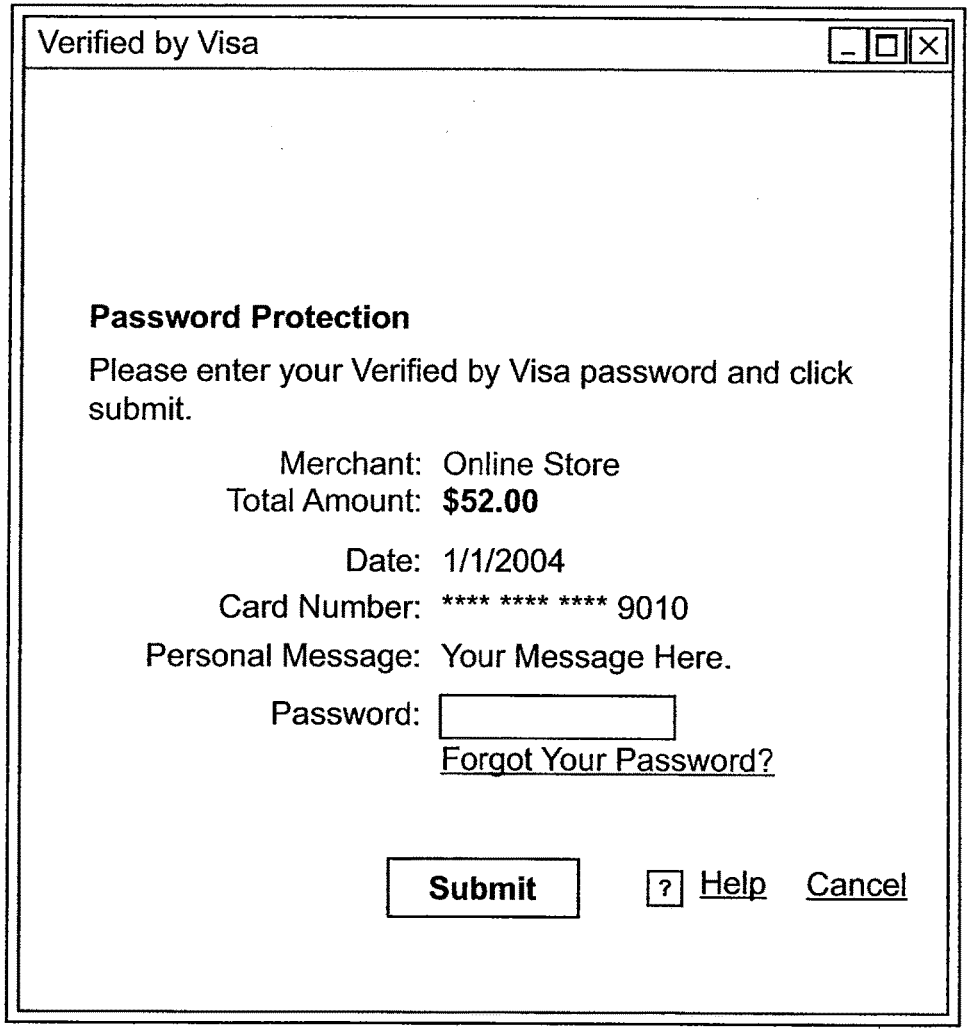
FIG. 6 shows an exemplary information request that prompts a consumer for a password.

The access control server 40 then authenticates the consumer 10 by sending a re-authentication request message to the client computer 10(*a*) operated by the consumer 10. After the re-authentication request message is received by the client computer 10(*a*), the client computer 10(*a*) displays information about the particular purchase to be authenticated and prompts the consumer 10 to enter his re-authentication information (step 825). Re-authentication information may be any identifying information such as a password, a card verification value, a full or partial social security number, the consumer's date of birth, and/or the consumer's email address. An exemplary screenshot of what the consumer 10 might see on the client computer 10(*a*) is shown in FIG. 6. After seeing a screenshot like the one shown in FIG. 6 on the client computer 10(*a*), the consumer 10 enters his password (or other identifier) into the client computer 10(*a*). The client computer 10(*a*) then sends the password to the access control server 40. The password is received by the access control server 40 and it verifies the password. The access control server 40 creates, digitally signs, and sends an authentication response to the merchant server 25. The access control server 40 also sends a transaction record to the authentication history server 50 for storage.

Figure 7:
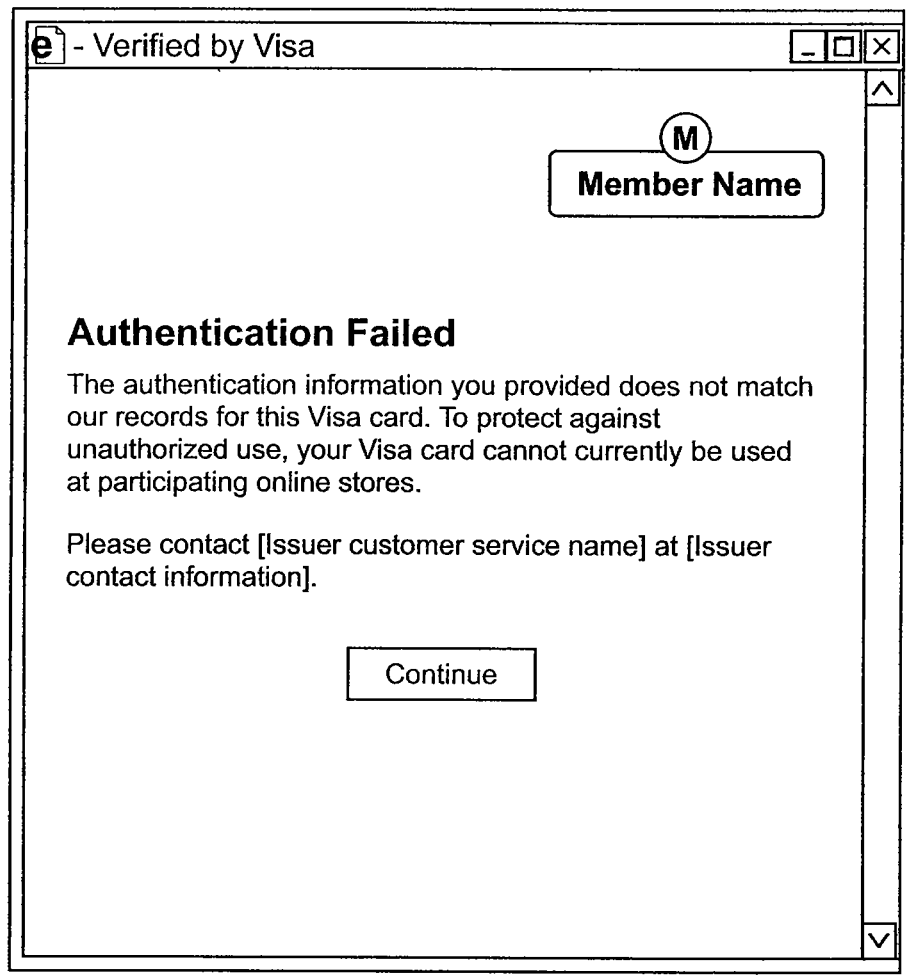
FIG. 7 shows an exemplary screen that informs a consumer that authentication failed.

If the consumer 10 is unable to correctly enter the correct password, the consumer 10 is notified that he cannot be authenticated (step 830). A message indicating this may be sent from the access control server 40 to the client computer 10(a). An exemplary screen shot that a consumer might see is shown in FIG. 7.

An authentication response message indicating that the consumer 10 failed authentication may then be sent from the access control server 40, to the client computer 10(a), and then to the merchant server 25. Alternatively, the authentication response message indicating that the consumer 10 failed authentication may be sent from the access control server 40, to the directory server 30, and then to the merchant server 25. If the merchant 20 receives a "Failed" authentication response from the access control server 40, the merchant 20 can proceed with the purchase, request another form of payment from the consumer 10 or decline the transaction (step 865). This supplemental payment request may be sent from the merchant server 25 to the client computer 10(a).

If the consumer 10 successfully re-authenticates himself by entering the correct password into the client computer 10(a), the access control server 40 may send an authentication response message back to the merchant server 25 via the client computer 10(a) or via the directory server 30 after receiving the correct password. The merchant server 25 then verifies that the digital signature is from a valid participating issuer 80 (step 840). If the digital signature is verified and the issuer's authentication response contains a message indicating successful authentication (e.g., an "Approved" message), then the merchant server 25 sends an authorization request message which includes a request to authorize the purchase transaction, to the acquirer payment processor 60. The authorization request message may include information including the amount of the purchase, the expiration date of the portable consumer device 8, the PAN (personal account number), and other information. It may also include information about the issuer's authentication response.

The acquirer payment processor 60 receives the authorization request from the merchant 20 and sends an authorization request to the payment processing network 70 (step 845). The payment processing network 70 then transmits the authorization request received from the acquirer payment processor 60 to the issuer 80 (step 850). The issuer 80 receives the authorization request containing additional authentication information and processes the transaction (step 855). The issuer 80 may choose to decline the authorization request for reasons unrelated to the authentication (e.g., insufficient funds or insufficient credit available to make the requested purchase).

An authorization response is returned to the acquirer payment processor 60 through the payment processing network 70 by the issuer 80. The acquirer payment processor 60 then returns the authorization response to the merchant 20. If the payment transaction is not authorized, the merchant 20 declines the transaction or requests another form of payment from the consumer 10 (step 865). If the payment transaction is authorized, the merchant 20 notifies the consumer 10 that the transaction is complete (step 860).

In an alternative embodiment, a re-authentication event database 23 can reside at the issuer 80. In this example, upon receiving a purchase message from the consumer 10, the merchant 20 analyzes the payment message against the re-authentication events in a re-authentication event database (not shown) at the issuer 80 via a directory server 30 (step 810). The steps outlined in FIG. 2 from this point forward are the same as described above.

Embodiments of the invention have a number of advantages. For example, embodiments of the invention can allow specialized payment transactions such as micro-payments, recurring payments, and payments made according to one-step processing to occur without re-authentication of the consumer. This makes it easier for the consumer to conduct such specialized payment transactions, and this increases transaction volume for the merchant. If, however, a re-authentication event that may indicate potential fraud occurs, the consumer can be asked to re-authenticate himself before the transaction can proceed. Thus, embodiments of the invention advantageously provide security for online transactions in appropriate situations, without impeding the progress of transactions where re-authentication may slow down a transaction or may be inconvenient to a consumer.

Although the examples described above specifically relate to embodiments where transactions occur online, it is understood that embodiments of the invention could also use other modes of communication including the mail and telephones (e.g., as in telephone orders using interactive voice response units) and in a physical store (e.g., at the physical point of sale). In addition, although purchase transaction are described in detail, embodiments of the invention may also be used for transactions such as money transfer transactions (e.g., between individuals and businesses).

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
receiving, by a server computer, a transaction message relating to a request by a consumer to conduct a transaction using a portable consumer device associated with a payment account number;
determining, by the server computer, that the portable consumer device is enrolled in an authentication program that provides greater security for the consumer when the consumer conducts transactions using the portable consumer device, by contacting a directory server which sends a request to an access control server operated by an issuer of the payment account number to determine if the portable consumer device is enrolled in the authentication program and receives a response from the access control server;
analyzing, by the server computer, the transaction message to determine if the transaction is a specialized transaction, wherein the specialized transaction is a purchase transaction and involves a recurring payment, a micro-payment, or a one-step online payment;
determining that the transaction is the specialized transaction;
analyzing the transaction message, using the server computer, to determine if a re-authentication event has taken place or has not taken place by analyzing data in the transaction message against re-authentication events in a re-authentication event database;
determining that the re-authentication event has not taken place; and
in response to determining that the re-authentication event has not taken place, initiating an authorization request message comprising the payment account number and an amount of the transaction to the issuer of the payment account number for approval, using the server computer, without sending a re-authentication message to the consumer.

2. The method of claim 1, wherein the re-authentication event is a change in the consumer's home address, payment terms, shipping address, billing address, email address, name, account number, payment method, portable consumer device expiration date, or password, and wherein the consumer was previously authenticated to the issuer.

3. The method of claim 1, wherein the re-authentication event is a new or different IP address, an out of pattern activity, an order amount above a specified dollar amount, or a long period of inactivity in the payment account.

4. The method of claim 1, wherein the re-authentication event is where a previous transaction was associated with an authentication failure or attempt.

5. The method of claim 1, wherein the transaction is a first transaction, the request is a first request, the transaction message is a first transaction message, the authorization request message is a first authorization request message, and the re-authentication event is a first re-authentication event, and wherein the method further comprises:
receiving by the server computer, a second transaction message relating to a second request by the consumer to conduct a second transaction using the portable consumer device;
determining, by the server computer, that the portable consumer device is enrolled in the authentication program;
analyzing, by the server computer, the second transaction message to determine if the second transaction is another specialized transaction;
determining that the second transaction is another specialized transaction;
analyzing the second transaction message, using the server computer, to determine if a second re-authentication event has taken place or has not taken place;
determining that the second re-authentication event has taken place; and
in response to determining that the second re-authentication event has taken place, initiating, by the server computer, a re-authentication process with the consumer;
determining, by the server computer, that the consumer is authentic; and
in response to determining that the consumer is authentic, initiating a second authorization request message to the issuer, using the server computer.

6. The method of claim 5, wherein the re-authentication process comprises sending, by the server computer and via the directory server, a first message to an access control server at the issuer, wherein the access control server thereafter sends a re-authentication request message to a client computer operated by the consumer and subsequently receives a password from the consumer via the client computer, and sends a second message to the server computer indicating that the consumer has been authenticated.

7. The method of claim 6 wherein the portable consumer device is in the form of a card and wherein the second transaction message comprises a digital certificate of the issuer.

8. The method of claim 1, wherein initiating the authorization request message to the issuer, using the server computer, comprises generating the authorization request message and sending the authorization request message to the issuer through an acquirer and a payment processing network.

9. A server computer comprising a non-transitory computer readable medium storing a computer program containing instructions thereon for instructing the server computer to perform a method comprising the steps of:
receiving a transaction message relating to a request by a consumer to conduct a transaction using a portable consumer device associated with a payment account number;
determining that the portable consumer device is enrolled in an authentication program that provides greater security for the consumer when the consumer conducts transactions using the portable consumer device, by contacting a directory server which sends a request to an access control server operated by an issuer of the payment account number to determine if the portable consumer device is enrolled in the authentication program and receives a response from the access control server;
analyzing the transaction message to determine if the transaction is a specialized transaction, wherein the specialized transaction is a purchase transaction and involves a recurring payment, a micro-payment, or a one-step online payment;
determining that the transaction is the specialized transaction;
analyzing the transaction message to determine if a re-authentication event has not taken place by analyzing data in the transaction message against re-authentication events in a re-authentication event database;
determining that the re-authentication event has taken place or has not taken place; and in response to determining that the re-authentication event has not taken place, initiating an authorization request message comprising the payment account number and an amount of the transaction to the issuer of the payment account number for approval, using the server computer, without sending a re-authentication message to the consumer.

10. The server computer of claim 9 wherein the transaction is a first transaction, the request is a first request, the transaction message is a first transaction message, the authorization request message is a first authorization request message, and the re-authentication event is a first re-authentication event, and wherein the method further comprises:
receiving by the server computer, a second transaction message relating to a second request by the consumer to conduct a second transaction using the portable consumer device;
determining, by the server computer, that the portable consumer device is enrolled in the authentication program;
analyzing, by the server computer, the second transaction message to determine if the second transaction is another specialized transaction;
determining that the second transaction is another specialized transaction;
analyzing the second transaction message, using the server computer, to determine if a second re-authentication event has taken place or has not taken place;
determining that the second re-authentication event has taken place; and
in response to determining that the second re-authentication event has taken place, initiating, by the server computer, a re-authentication process with the consumer;
determining, by the server computer, that the consumer is authentic; and
in response to determining that the consumer is authentic, initiating a second authorization request message to the issuer, using the server computer.

11. The server computer of claim 10 wherein the re-authentication process comprises sending, by the server computer and via the directory server, a first message to an access control server at the issuer, wherein the access control server thereafter sends a re-authentication request message to a client computer operated by the consumer and subsequently receives a password from the consumer via the client computer, and sends a second message to the server computer indicating that the consumer has been authenticated.

12. A system comprising:
(a) a server computer comprising a non-transitory computer readable medium storing a computer program containing instructions thereon for instructing the server computer to perform the steps of
receiving a transaction message relating to a request by a consumer to conduct a transaction using a portable consumer device associated with payment account number,
determining that the portable consumer device is enrolled in an authentication program that provides greater security for the consumer when the consumer conducts transactions using the portable consumer device, by contacting a directory server which sends a request to an access control server operated by an issuer of the payment account number to determine if the portable consumer device is enrolled in the authentication program and receives a response from the access control server,
analyzing the transaction message to determine if the transaction is a specialized transaction, wherein the specialized transaction is a purchase transaction and involves a recurring payment, a micro-payment, or a one-step online payment,
determining that the transaction is the specialized transaction,
analyzing the transaction message to determine if a re-authentication event has taken place or has not taken place by analyzing data in the transaction message against re-authentication events in a re-authentication event database,
determining that the re-authentication event has not taken place, and
in response to determining that the re-authentication event has not taken place, initiating an authorization request message comprising the payment account number and an amount of the transaction to the issuer of the payment account number for approval, using the server computer, without sending a re-authentication message to the consumer; and
(b) a client computer coupled to the server computer.

13. The system of claim 12 further comprising:
(c) the directory server in communication with the server computer; and
(d) an access control server coupled to the directory server.

14. The system of claim 12 wherein the transaction is a first transaction, the request is a first request, the transaction message is a first transaction message, the authorization request message is a first authorization request message, the re-authentication event is a first re-authentication event, and wherein the instructions further comprise:
receiving by the server computer, a second transaction message relating to a second request by the consumer to conduct a second transaction using the portable consumer device;
determining, by the server computer, that the portable consumer device is enrolled in the authentication program;
analyzing, by the server computer, the second transaction message to determine if the second transaction is another specialized transaction;
determining that the second transaction is another specialized transaction;
analyzing the second transaction message, using the server computer, to determine if a second re-authentication event has taken place or has not taken place;
determining that the second re-authentication event has taken place; and
in response to determining that the second re-authentication event has taken place, initiating, by the server computer, a re-authentication process with the consumer;
determining, by the server computer, that the consumer is authentic; and
in response to determining that the consumer is authentic, initiating a second authorization request message to the issuer, using the server computer.

* * * * *